United States Patent
Yoshida

(10) Patent No.: US 9,624,070 B2
(45) Date of Patent: Apr. 18, 2017

(54) CABLE BEAD MANUFACTURING METHOD AND APPARATUS THEREFOR

(75) Inventor: Yuichi Yoshida, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 506 days.

(21) Appl. No.: 14/238,383

(22) PCT Filed: Aug. 10, 2012

(86) PCT No.: PCT/JP2012/070568
§ 371 (c)(1),
(2), (4) Date: Mar. 5, 2014

(87) PCT Pub. No.: WO2013/022106
PCT Pub. Date: Feb. 14, 2013

(65) Prior Publication Data
US 2014/0197263 A1    Jul. 17, 2014

(30) Foreign Application Priority Data

Aug. 11, 2011 (JP) .................................. 2011-175946

(51) Int. Cl.
*B65H 81/00* (2006.01)
*B29D 30/48* (2006.01)
*D07B 7/16* (2006.01)

(52) U.S. Cl.
CPC ............. *B65H 81/00* (2013.01); *B29D 30/48* (2013.01); *D07B 7/165* (2013.01)

(58) Field of Classification Search
CPC .. B29D 30/48; B29D 30/50; B29D 2030/487; B65H 81/00
(Continued)

(56) References Cited

U.S. PATENT DOCUMENTS

| | | | | |
|---|---|---|---|---|
| 1,336,328 A | * | 4/1920 | Ziegler .................. | B29D 30/10 242/156 |
| 2,516,734 A | * | 7/1950 | Van Den Berge ...... | H01F 41/08 242/434.5 |

(Continued)

FOREIGN PATENT DOCUMENTS

| CN | 101200120 A | 6/2008 |
|---|---|---|
| EP | 1 552 917 A1 | 7/2005 |

(Continued)

OTHER PUBLICATIONS

Dec. 2, 2015 Extended Search Report issued in European Patent Application No. 12821972.2.

(Continued)

*Primary Examiner* — Emmanuel M Marcelo
(74) *Attorney, Agent, or Firm* — Oliff PLC

(57) ABSTRACT

The invention provides a method and apparatus for easily and efficiently manufacturing a cable bead, which features excellent wire winding performance. In this method, an annular core is held by a core rotating means. Then a reel wound with a wire is revolved in one direction through the inside and the outside of the core by a reel revolving means by holding the reel wound with a wire alternately on one side and on the other side of the core. And a wire is wound helically around the core as the core is rotated in a circumferential direction in association with the revolving motion of the reel.

6 Claims, 5 Drawing Sheets

(58) Field of Classification Search
USPC .................................. 242/434, 434.5, 434.7
See application file for complete search history.

(56) References Cited

U.S. PATENT DOCUMENTS

| | | | | |
|---|---|---|---|---|
| 4,768,725 | A * | 9/1988 | Daines | B65H 81/04 |
| | | | | 242/434.5 |
| 4,938,437 | A * | 7/1990 | Rausch | B29D 30/48 |
| | | | | 152/527 |
| 5,041,185 | A * | 8/1991 | Ohashi | H02K 15/105 |
| | | | | 156/192 |
| 5,086,983 | A * | 2/1992 | Darrieux | B65H 81/04 |
| | | | | 242/434.5 |
| 5,141,032 | A * | 8/1992 | Rausch | B29D 30/48 |
| | | | | 140/88 |
| 8,080,120 | B2 | 12/2011 | Sano et al. | |
| 2012/0324857 | A1 * | 12/2012 | Ogawa | B29D 30/48 |
| | | | | 57/11 |

FOREIGN PATENT DOCUMENTS

| | | |
|---|---|---|
| EP | 2537667 A1 | 12/2012 |
| JP | A-7-68662 | 3/1995 |
| JP | A-2001-047169 | 2/2001 |
| JP | WO 2004/018187 A1 | 3/2004 |
| JP | A-2006-110981 | 4/2006 |
| JP | A-2006-205594 | 8/2006 |
| JP | A-2008-168612 | 7/2008 |
| WO | 2011/030764 A1 | 3/2011 |

OTHER PUBLICATIONS

Jul. 7, 2015 Office Action issued in Japanese Application No. 2011-175946.
Nov. 13, 2012 International Search Report issued in International Patent Application No. PCT/JP2012/070568.
Nov. 13, 2012 Written Opinion issued in International Patent Application No. PCT/JP2012/070568.

* cited by examiner

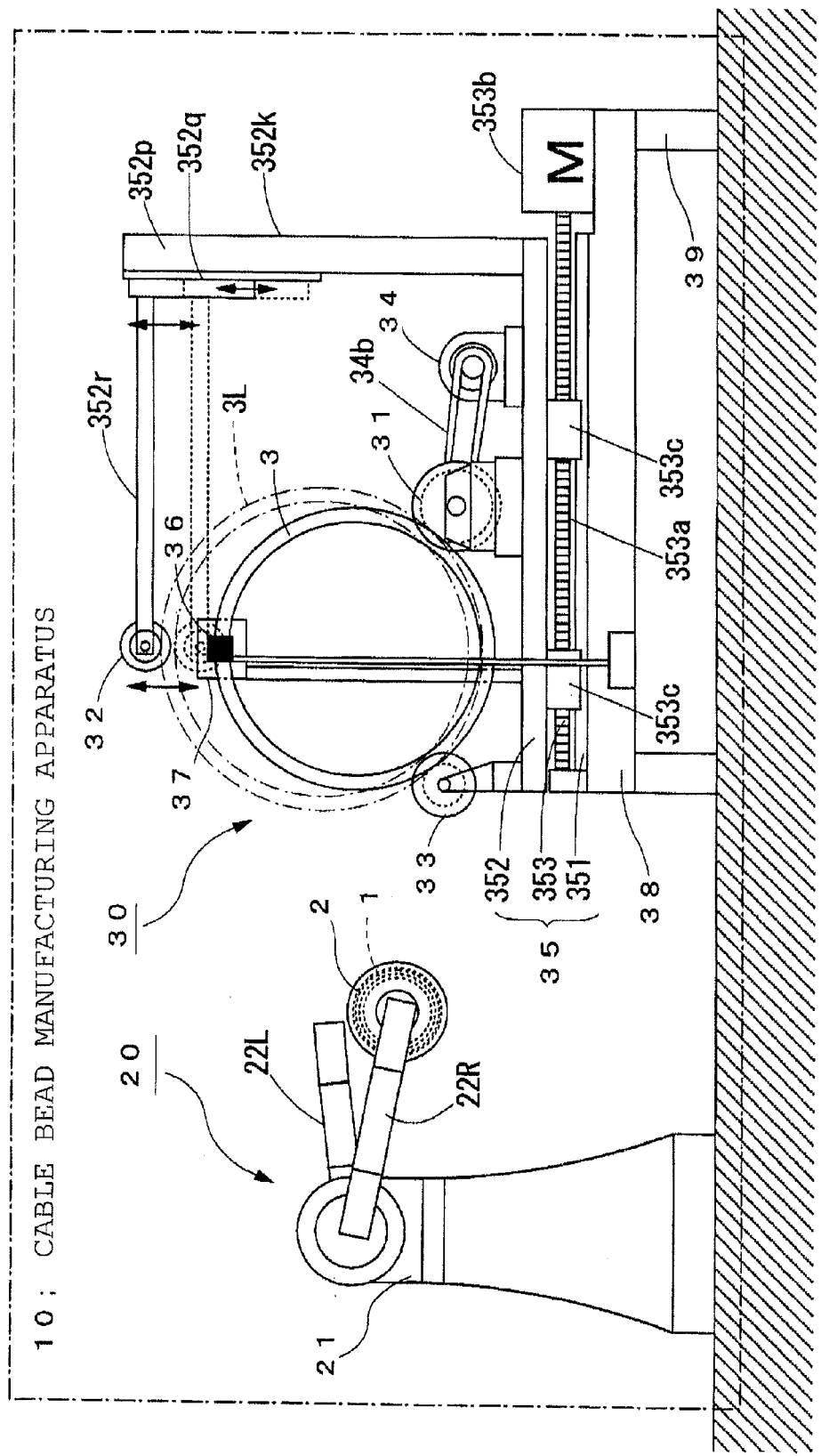
FIG.1  10: CABLE BEAD MANUFACTURING APPARATUS

CABLE BEAD MANUFACTURING METHOD AND APPARATUS THEREFOR

BACKGROUND OF THE INVENTION

1. Field of the Invention

The present invention relates to a cable bead manufacturing method and an apparatus therefor.

2. Description of the Related Art

A cable bead consists of an annular (ring-shaped) core and a wire, whose diameter is smaller than that of the core, helically (spirally) wound around the core. The wire is wound around the annular core by repeating the action of passing the wire from the outside through the opening of the ring of the core and then pulling the wire to the outside of the core (see Patent Document 1, for instance).

In another method for winding a wire around the annular core, a reel is moved in swing motions in planes parallel to the annular core while the annular core is rotated in a circumferential direction. At one end of the swing motion, the reel is traversed inside the ring of the annular core, and at the other end of the swing motion, the reel is traversed outside the ring of the annular core. Thus, by repeating these motions, the wire is wound around the annular core (see Patent Document 2, for instance).

In another proposed method, an end of a wire is temporarily secured to an annular core by a chucking mechanism, and the wire is wound helically around the annular core, with the reel revolving through the inside and the outside of the annular core as the core is rotated in a circumferential direction (see Patent Document 3, for instance).

RELATED ART DOCUMENT

Patent Document

Patent Document 1: Japanese Unexamined Patent Application Publication No. 7-68662
Patent Document 2: Japanese Unexamined Patent Application Publication No. 2008-168612
Patent Document 3: Japanese Unexamined Patent Application Publication No. 2001-47169

SUMMARY OF THE INVENTION

Problem to be Solved by the Invention

However, with the method using the swing motions of the reel, it is necessary to use a long swinging arm. Otherwise, the angle the led-out wire assumes relative to the tangent line to the circle of the annular core at the wire winding point will be larger, and this will interfere with the winding performance. This will also present a problem of the equipment becoming larger. Moreover, the use of swing motions in planes parallel to the core makes it hard to correctly control the wire position relative to the core in winding.

Also, with the method using the revolution of the reel, the reel undergoes a large circular motion with a large diameter in a plane perpendicular to the plane of the core. As a result, there will be a large angle in which the wire is wound around the annular core. Consequently, the winding performance is not necessarily satisfactory.

The present invention aims to provide a method and apparatus for manufacturing a cable bead easily and efficiently with superior winding performance.

Means for Solving the Problem

The present invention provides a method for manufacturing a cable bead, which comprises the steps of revolving a reel wound with a wire in one direction through the inside and the outside of an annular core by holding the reel alternately on one side and on the other side of the core, rotating the core in a circumferential direction in association with the revolving motion of the reel, and winding the wire helically around the core.

The terms "one side" and "the other side" of the core herein refer to one side (e.g., right side) and the other side (e.g., left side) of a plane including the plane formed by the ring of the core.

As described above, the reel can be revolved easily through the inside and the outside of the core if the motion of traversing the reel through the ring of the annular core is effected by a switch of the hold on the reel. Also, this gives an increased degree of freedom to the revolving motion such that the cable beads of different sizes can be manufactured easily without changing the equipment.

Also, the present invention provides the method for manufacturing a cable bead, in which the operation to be repeated comprises the steps of holding the reel from a side thereof opposite from the core, that is, from the opposite side of the plane formed by the ring of the core, and swinging the reel on the other side of the core, switching the side for holding the reel after the swing motion, swinging the reel held from the switched side for holding the reel on the one side of the core, and again switching the side for holding the reel after the swing motion.

Thus, the reel is swung on the other side of the annular core, and then the hold on the reel is switched before the reel is swung on the one side. In this manner, the reel can be revolved reliably through the inside and the outside of the core. Also, the revolving motion can be controlled easily so that the position of wire at winding can be controlled correctly and an array of wire can be made in desired positions relative to the core. Accordingly, the quality and reliability of the manufactured cable bead can be enhanced.

Moreover, the Z-winding cable bead and the S-winding cable bead can be manufactured readily by simply changing the direction of rotation of the core.

Also, the present invention provides the method for manufacturing a cable bead which further includes the steps of sliding the core, as it is rotated in a circumferential direction, in a direction from the outermost position toward the innermost position of the reel when the reel is swung from the inside to the outside of the core and sliding the core, as it is rotated in a circumferential direction, in a direction from the innermost position toward the outermost position of the reel when the reel is swung from the outside to the inside of the core.

Thus the winding speed can be raised by the coordinated movements of both the core and reel such that the winding of the wire can be performed efficiently.

Also, the present invention features the revolution of the reel within a plane perpendicular to the plane formed by the ring of the core (core plane).

This arrangement not only minimizes the change in winding angle of wire, but also shortens the revolution trajectory. Hence, the wire winding performance will improve, and the wire can be wound efficiently.

Also, the present invention provides an apparatus for manufacturing a cable bead by winding a wire wound around a reel spirally around an annular core. The apparatus includes a reel revolving means disposed on one side and on the other side of the core for revolving the reel through the inside and the outside of the core by holding the reel alternately on the one side and on the other side of the core and a core rotating means for rotating the core in a circumferential direction in association with the revolving motion of the reel.

The arrangement like this can accomplish the revolving motion of the reel with ease through the inside and the outside of the core. And the cable bead manufacturing apparatus thus obtained displays a greater degree of freedom for the revolving motion and a superior wire winding performance.

Also, the present invention provides the apparatus for manufacturing a cable bead, in which the reel revolving means further includes a first arm disposed on one side of the core to hold the reel on a side thereof opposite from the core and swing the reel to the other side of the core and a second arm disposed on the other side of the core to hold the reel on a side thereof opposite from the core and swing the reel to the one side of the core. And each of the arms includes a body, a first movable member rotatably connected to the body, a second movable member rotatably connected to the first movable member, and a holding member rotatably connected to the second movable member to hold the reel, the holding member provided with a switching means for holding and releasing the reel.

Thus, after the reel is swung to the other side of the core, the hold on the reel is switched and then the reel is swung to the one side of the core. Therefore the cable bead manufacturing apparatus thus obtained can effect easy revolution of the reel through the inside and the outside of the core.

Also, the present invention provides the apparatus for manufacturing a cable bead, which further includes a slide mechanism for sliding the core in a direction parallel to a straight line connecting a point where the reel is located at an innermost position of the core and a point where the reel is located at an outermost position of the core.

Thus, as viewed in a direction perpendicular to the core plane, the reel and the core can be moved in mutually opposite directions. That is, the core is moved in a direction toward the innermost position of the reel when the reel moves from the inside to the outside of the core and in a direction toward the outermost position of the reel when the reel moves from the outside to the inside of the core. This will enhance the manufacturing efficiency by raising the winding speed.

Also, the present invention features a sensor that can detect the position where the wire is led out from the core.

This allows adjustment of the rotating position in wire winding, so that a reliable array of wire can be made in desired positions on the core.

Also, the present invention features guides that are disposed along the outer periphery of the reel and restrict the position in the reel width direction of the wire led out from the reel.

This arrangement improves the wire winding performance by guiding the wire lead-out position to an optimum position.

Also, the present invention features a brake mechanism provided on the reel.

This reduces slack in the wire by constantly giving a proper tension to the wire. Hence the wire winding performance is further improved.

It is to be understood that the foregoing summary of the invention does not necessarily recite all the features essential to the invention, and subcombinations of all these features are intended to be included in the invention.

BRIEF DESCRIPTION OF THE DRAWINGS

FIG. 1 is an illustration showing a cable bead manufacturing apparatus in accordance with an embodiment of the present invention.

BEST MODE FOR CARRYING OUT THE INVENTION

Figures 2A, 2B:
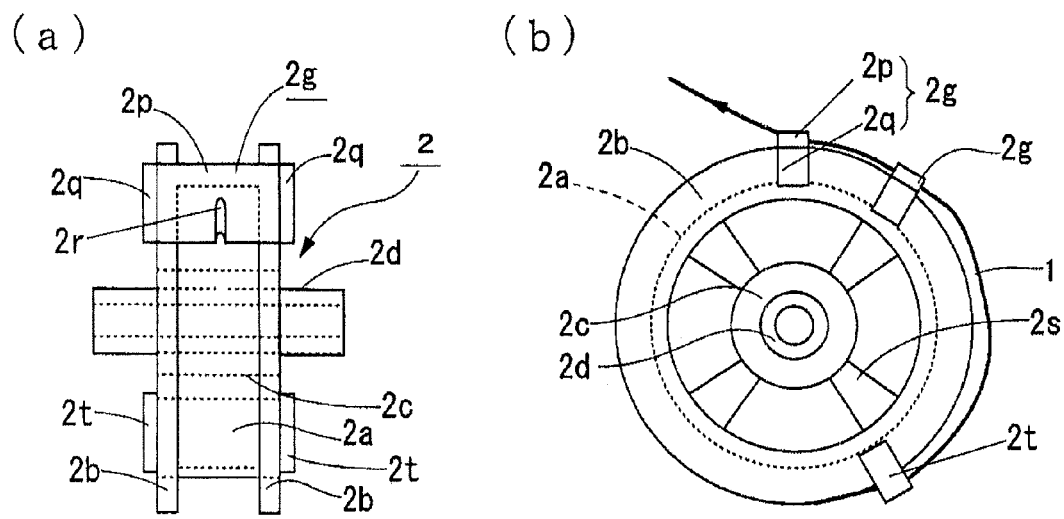
FIG. 2 is illustrations showing an example of a reel in accordance with an embodiment of the present invention.

The invention will now be described based on preferred embodiments which do not intend to limit the scope of the claims of the present invention but exemplify the invention. All of the features and the combinations thereof described in the embodiments are not necessarily essential to the invention.

FIG. 1 is an illustration showing a cable bead manufacturing apparatus 10 according to the present invention. The cable bead manufacturing apparatus 10 includes a reel revolving means 20, a core moving unit 30, and a not-shown control means for controlling the rotation and movement of an annular core (hereinafter referred to as "core") 3 by the core moving means 30 and the revolving motion of the reel 2 by the reel revolving means 20. And the cable bead manufacturing apparatus 10 winds a wire 1 led out from a reel 2 helically (spirally) around the core 3 by revolving the reel 2, wound with the wire 1, through the inside and the outside of the core 3.

As shown in FIGS. 2A and 2B, the reel 2 includes a cylinder 2a, which comes with a wire 1 wound around it, a pair of flanges 2b, which are disposed on either side of the cylinder 2a, a hub 2c, which serves as the core of the reel, a shaft member 2d, which is a hollow cylinder fitted inside the hub 2c and protruding from the ends of the hub 2c, a plurality of wire guides 2g, and a not-shown braking mechanism. The flanges 2b and the hub 2c are coupled to each other via a plurality of spokes 2s. Also, each of wire guides 2g includes a horizontal piece 2p, which is disposed in a bridging manner on the outside of the flanges 2b, and attaching pieces 2q, which are connected to the ends of the horizontal piece and attached to the peripheral portions of the flanges 2b. Provided in a substantially middle portion of the horizontal piece 2p is a guide groove 2r for guiding the wire 1 led out from the reel 2. It is to be noted that the reference numeral 2t refers to a holder piece which is attached to a peripheral portion of the flanges 2b to prevent the wire 1 from falling out of the reel 2.

The reel revolving means 20, which revolves the reel 2 by holding it, includes a body 21, first and second arms 22R and 22L, and a switching means for switching the hold between the first and second arms 22R and 22L.

The core moving unit 30 includes a drive roll 31, a holddown roll 32, a support roll 33, a drive unit 34, a core slide means 35, a winding position detecting sensor 36, an illuminator 37, and a base 38. A core rotating means is constituted by the drive roll 31, the holddown roll 32, the support roll 33, and the drive unit 34. Note that the reference numeral 39 refers to the legs of the body 38.

In this embodiment, the drive roll 31 and the support roll 33 are disposed in the same horizontal plane, and they support a core 3 upright from below such that the core plane, which is the plane of the ring of the core 3, is perpendicular to the horizontal plane. The holddown roll 32 is disposed in a position above the core 3 so as to hold down the core 3 from above.

In the following description, the direction from left to right in FIG. 1 will be referred to as the front side or frontward. The core moving means 30 is installed on the front side of the reel revolving means 20. Also, the right side of the ring of the core 3 when seen from the reel revolving means 20 will be referred to as the right side, and the left side thereof as the left side.

Figure 3:
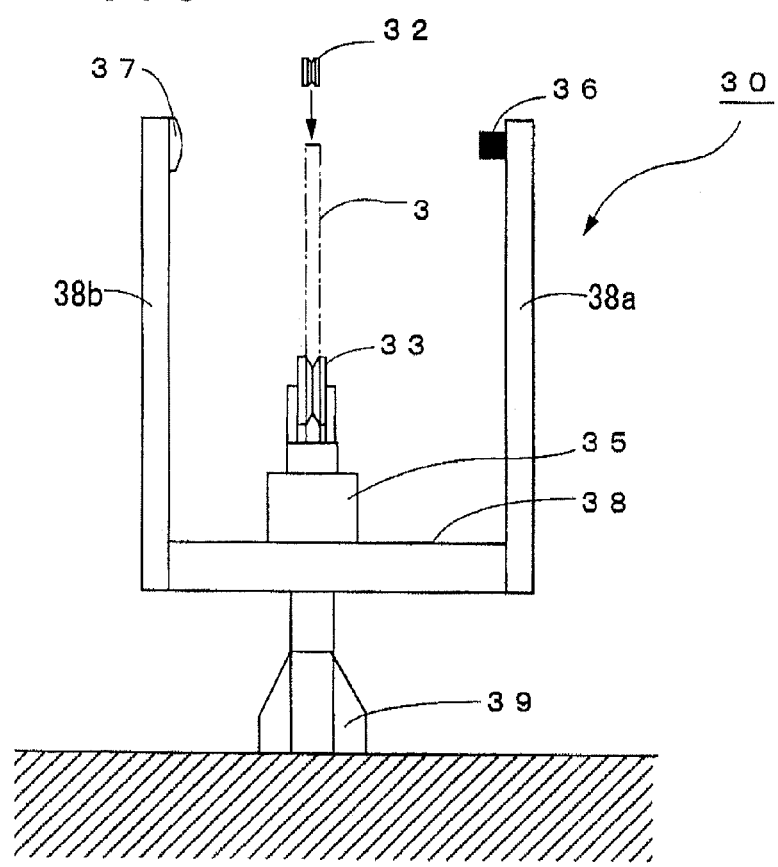
FIG. 3 is an elevational view of a core moving means.

As shown in FIG. 3, a sensor 36 for detecting winding position on the core moving means 30 is disposed on the right side of a core slide means 35, and an illuminator 37 is disposed on the left side thereof.

Figure 4:
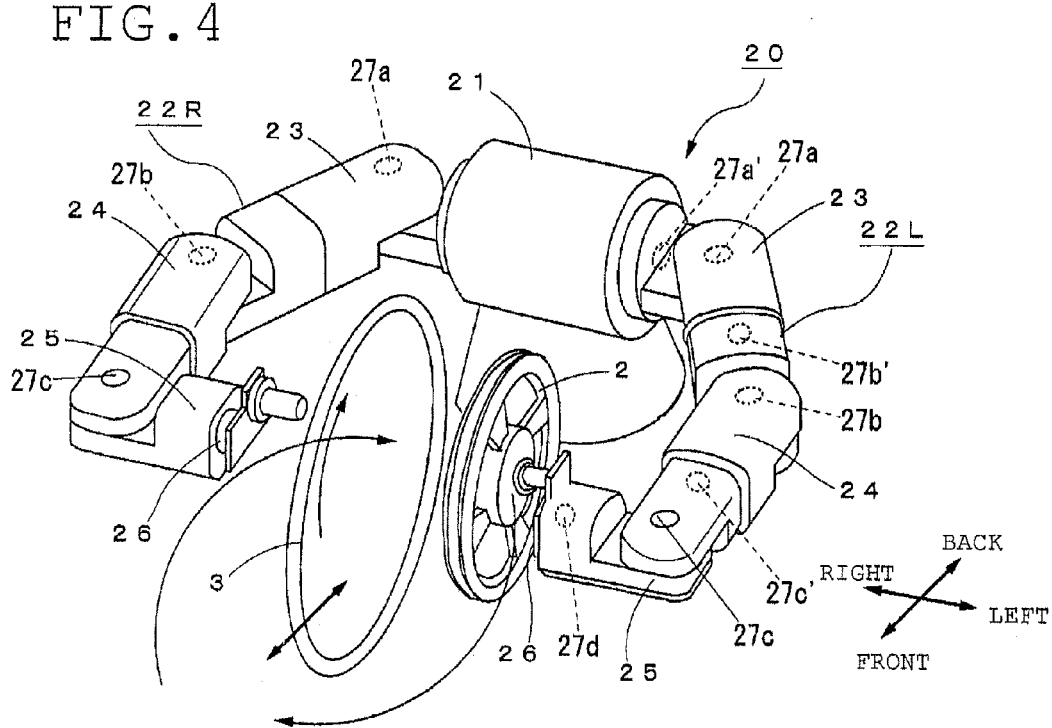
FIG. 4 is a perspective view showing a structure of a reel revolving means.

FIG. 4 is a perspective view showing a structure of a reel revolving means 20. One end of the first arm 22R is attached to the right side of the body 21, which is a fixed part, and one end of the second arm 22L to the left side thereof. That is, the first arm 22R is located on the right side of the core 3, and the second arm 22L on the left side thereof. It is to be noted here that the first arm 22R and the second arm 22L may be mounted on separate bodies, respectively.

The first and second arms 22R and 22L include each a first movable member 23 rotatably connected to the body 21, a second movable member 24 rotatably connected to the first movable member 23, and a holding member 25 rotatably connected to the second movable member 24. Provided on the side of the holding member 25 further from the second movable member 24 is a holder 26 for holding the reel 2.

One end of the first movable member 23 is attached to the body 21 by means of a horizontal rotation mechanism 27*a* and a vertical rotation mechanism 27*a*'. The horizontal rotation mechanism 27*a* rotates the first movable member 23 within a horizontal plane relative to the body 21 (within a plane defined by the body 21 and the first movable member 23 when the vertical rotation mechanism 27*a*' is operated). The vertical rotation mechanism 27*a*' rotates the first movable member 23 within a vertical plane relative to the body 21. For the horizontal and vertical rotation mechanisms 27*a* and 27*a*', a stepping motor, an AC servo motor, or the like may be used. In so doing, the motor body may be secured to the body 21, and the output shaft of the motor to the first movable member 23 to enable rotation control of the motor. Then the angle formed by the body 21 and the first movable member 23 may be changed to any optional angle.

The second movable member 24 is attached to the first movable member 23 by means of a horizontal rotation mechanism 27*b* and a vertical rotation mechanism 27*b*', which are identical to the horizontal rotation mechanism 27*a* and the vertical rotation mechanism 27*a*', respectively. Also, the holding member 25 is attached to the second movable member 24 by means of a horizontal rotation mechanism 27*c* and a vertical rotation mechanism 27*c*', which are identical to the horizontal rotation mechanism 27*a* and the vertical rotation mechanism 27*a*', respectively.

Also, the holding member 25 is provided with a holder rotation mechanism 27*d* which rotates the holder 26 in a vertical plane relative to the holding member 25.

Figure 5:
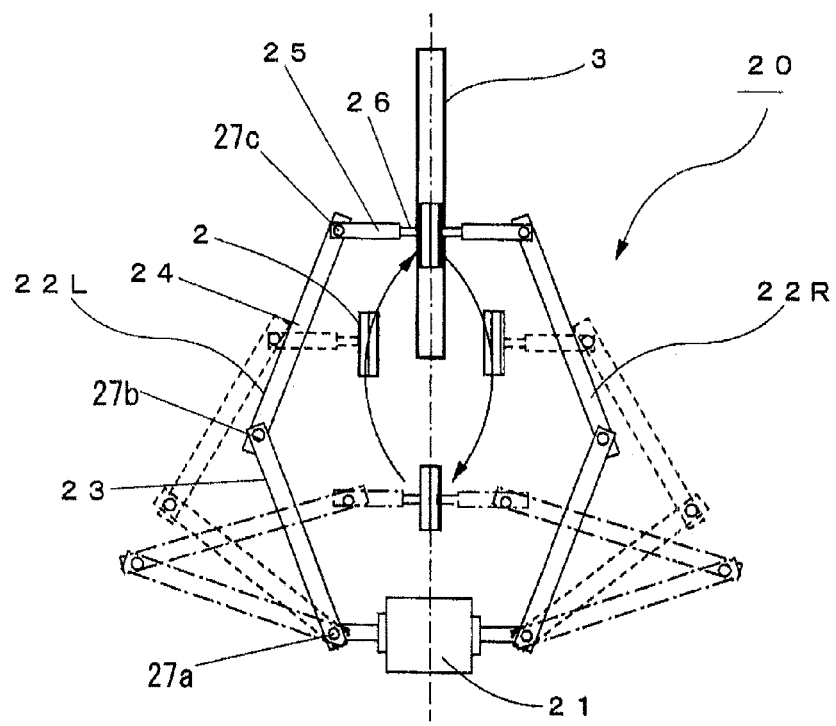
FIG. 5 is an illustration for explaining the swing motions by a reel revolving means.

Therefore, as shown in FIG. 5, the angles (horizontal angle and elevation angle) formed by the extension direction of the body 21 and the extension direction of the first movable member 23 are changed by the horizontal rotation mechanism 27*a* and the vertical rotation mechanism 27*a*'; the angles formed by the extension direction of the first movable member 23 and the extension direction of the second movable member 24 are changed by the horizontal rotation mechanism 27*b* and the vertical rotation mechanism 27*b*'; and the angles formed by the extension direction of the second movable member 24 and the extension direction of the holding member 25 are changed by the horizontal rotation mechanism 27*c* and the vertical rotation mechanism 27*c*'. Thus the reel 2 held by the holder 26 of the holding member 25 of the first arm 22R or the reel 2 held by the holder 26 of the holding member 25 of the second arm 22L can be rotated in an optional plane.

Also, the holding angle of the reel 2 can be changed by the holder rotation mechanism 27*d*. That is, the reel 2 can be held at a tilt relative to the vertical plane.

Figure 6A:
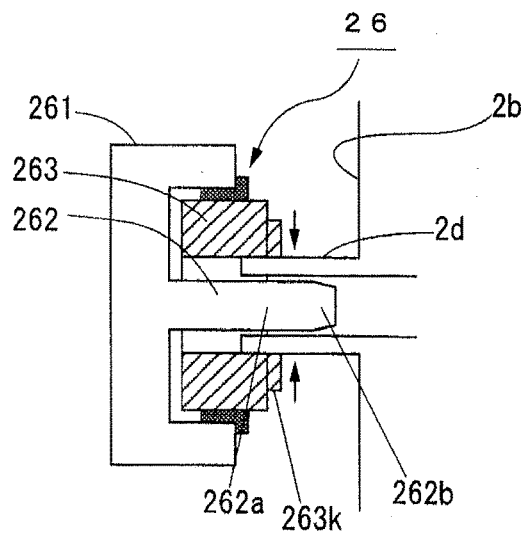
FIG. 6 is illustrations showing an example of structure of a holder.
Figure 6B:
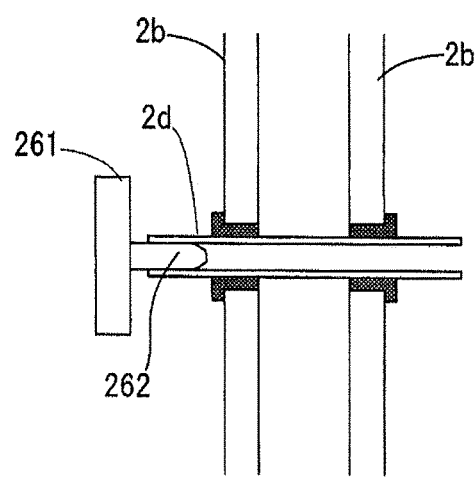

The holder 26, as shown in detail in FIGS. 6A and 6B, includes an attachment member 261, a holding bar 262, and a chuck 263.

The holding bar 262, which is a cylindrical projection from the plate-like attachment member 261, is inserted into the interior of a shaft member 2*d* projecting from a flange 2*b* of the reel 2. The chuck 263, which is disposed coaxially with the holding bar 262, grasps the outer periphery of the shaft member 2*d* with fingers 263*k*. The chuck 263 is rotatably attached to the attachment member 261 by means of a bearing or the like. In this embodiment, the diameter of the insertion part 262*a* of the holding bar 262 is smaller than the inner diameter of the shaft member 2*d*, and the diameter of the end portion 262*b* is smaller than the diameter of the insertion part 262*a*. As a result, the reel 2 grasped by the chuck 263 can be so held as to be rotatable around the holding bar 262. The chuck 263 to be used may be a well-known chuck, such as an electromagnetic chuck, for instance.

The holding bar 262 and the chuck 263 of the holder 26 of the first arm 22R constitute a first switching means, and the holding bar 262 and the chuck 263 of the holder 26 of the second arm 22L constitute a second switching means.

It is to be noted that when the reel 2 is of a type having the hub 2*c* of the reel 2 rotatably coupled to the shaft member 2*d* via a bearing or having the flange 2*b* rotatably coupled to the hub 2*c* via a bearing, the arrangement may be such that the chuck 263 is excluded and instead the holding bar 262 is fitted into the shaft member 2*d* by employing the diameter of the insertion part 262*a* of the holding bar 262 nearly the same as the inner diameter of the shaft member 2*d*.

In such a case, the holding bar 262 and the arms (first and second arms 22R and 22L), which are the means for moving the holding bar 262 in the axial direction of the reel 2, serve as the switching means.

As shown in FIG. 1, the drive roll 31, the holddown roll 32, the support roll 33, and the drive unit 34, which constitute the core rotating means, are installed on a guide member 352, configured to slide along guide rails 351, which together constitute the core slide means 35. More specifically, the support roll 33 is disposed on the back side (side of the reel revolving means 20) of the guide member 352, and the drive roll 31 and the drive unit 34 on the front side thereof. The drive unit 34 may, for instance, be constituted by a motor with a speed changer. The core 3 can be rotated in a circumferential direction by rotating the drive roll 31 with a driving belt 34b coupling the output shaft of the motor with the rotating shaft of the drive roll 31, for instance.

The holddown roll 32 is mounted on a holddown roll support stand 352k which may be installed upright on the front side of the drive unit 34. The holddown roll support stand 352k has a vertical member 352p, a lifting and lowering means 352q provided on a core 3-side side face of the vertical member 352p, and a horizontal member 352r attached to the lifting and lowering means 352q and protruding on the core 3 side. And the holddown roll 32 is mounted on the core 3-side end of the horizontal member 352r.

The drive roll 31 and the support roll 33 are spaced apart from each other by a distance smaller than the diameter of the core 3.

In the present embodiment, the drive roll 31, holddown roll 32, and support roll 33 used are all V-shaped rolls, and the use of the vertically movable holddown roll 32 as described above permits the holding of a core 3L of a different diameter as delineated by the thin chain lines in FIG. 1.

The core slide means 35 includes guide rails 351, which are mounted on the base 38 in such a manner as to extend in a front-back direction, a guide member 352, which slides along the guide rails 351, and a slide mechanism 353, which causes the guide member 352 to slide along the guide rails 351. Note that the "front-back" direction meant here is the "right-left" direction in FIG. 1, which is more specifically the direction of approach and return relative to the core 3 in a plane parallel to the plane of the ring of the core 3.

In the present embodiment, a ball screw is used for the slide mechanism 353, but any other well-known slide mechanism, such as a rack-and-pinion mechanism, may be used as well. Of the ball screw, one end of the external thread 353a is secured to the guide rails 351 and the other end thereof is attached to the motor 353b, whereas the internal thread 353c thereof is secured to the guide rail 351 side of the guide member 352.

The winding position detecting sensor 36, as shown in FIG. 3, is attached to the sensor support member 38a which is installed upright on the right side of the base 38. As the winding position detecting sensor 36, a sensor provided with a camera means for capturing the position of the wire 1 led out from the core 3 and an image processing means for identifying the position of the wire 1 led out from the core 3 by performing an image processing on the image captured.

The illuminator 37, which is attached to the illuminator support member 38b installed upright on the left side of the base 38, illuminates the neighborhood of the position of the wire 1 led out from the core 3.

A description will now be given of a specific method for manufacturing a cable bead.

A cable bead is formed by wrapping the core with alternate layers of S-winding and Z-winding of a wire, for instance. Hereinbelow, a description is given of an S-winding operation.

First a core 3 is placed on the drive roll 31 and the support roll 33, and then the holddown roll 32 is lowered until it touches the upper portion of the core 3. Thus the core 3 is held by the three rolls 31 to 33 in a vertical plane.

Figures 7A, 7B, 7C, 7D:
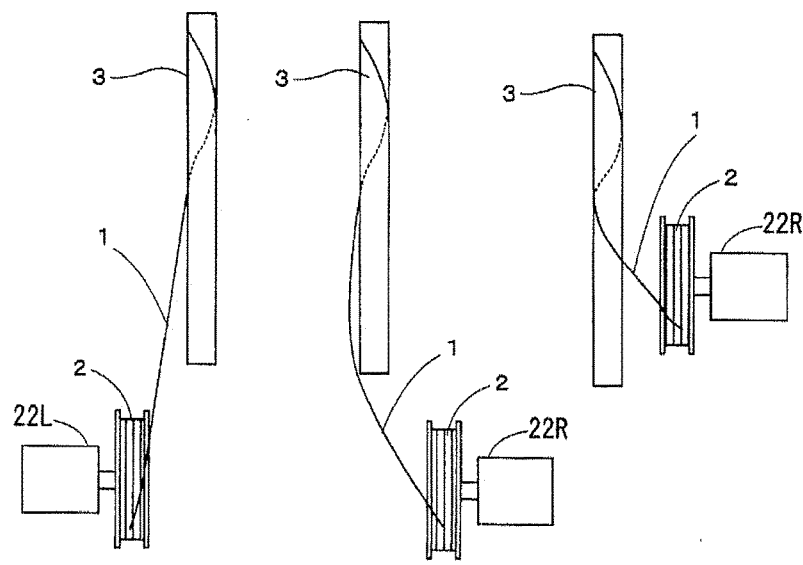
FIG. 7 is illustrations for explaining the winding of a wire.

Next, the holding bar 262 provided on the holder 26 of the second arm 22L is inserted into the interior of the shaft member 2d until the insertion part 262a thereof is inside the shaft member 2d of the reel 2. Then the outer periphery of the shaft member 2d is grasped by the fingers 263k of the chuck 363. The reel 2, as shown in FIG. 7A, is held by the second arm 22L on the left side of the core 3. More specifically, the reel 2 is held by the second arm 22L on the left side of the reel 2, which is the side opposite from the position of the core 3, and at a predetermined position within the inside of a virtual cylinder axially extending from the ring of the core 3 (hereinafter referred to as the "inside of the core"). The predetermined position, which is the starting point of the swing (revolving) motion of the reel 2, is an innermost point of the core 3, so that this position will hereinafter be referred to as the innermost position of the reel. It is to be noted also that the reel 2 is held by the second arm 22L such that the axial (right-left) direction of the reel 2 is in parallel with the axial (right-left) direction of the core 3.

Next, as shown in FIG. 7B, the reel 2 is swung on the left side of the core 3 from the inside to the outside thereof as the second arm 22L is contracted by changing the extension directions of the first movable member 23, the second movable member 24, and the holding member 25 by the use of the respective rotation mechanisms 27a to 27c of the second arm 22L.

The wire 1, which is secured to the winding point of the core 3, is led out from the reel 2. At this time, if the core 3 is moved frontward in the direction further from the reel 2 by moving the guide member 352 frontward with the operation of the slide mechanism 353 of the core slide means 35, then the lead-out speed of the wire 1 will be faster because the relative speed in the front-back direction of the reel 2 relative to the core 3 will be greater.

In the present embodiment, the lead-out position of the wire 1 is stabilized by wire guides 2g which are provided on the reel 2 so as to restrict the lateral position of the wire 1 being led out. Also, the reel 2 has a braking mechanism built therein, which ensures that an optimum tension is applied to the wire 1 as it is led out from the reel 2.

At the point when the reel 2 is swung to the left outside position of the core 3, the side for holding the reel 2 is switched. More specifically, the holding bar 262 of the first arm 22R, which is located on the right side, is inserted into the interior of the shaft member 2d of the reel 2. Then the outer periphery of the shaft member 2d is grasped by the chuck 263, and at the same time the chuck 263 of the second arm 22L, which is located on the left side, is opened and the holding bar 262 is pulled out from the shaft member 2d of the reel 2. Thus, as shown in FIG. 7C, the side for holding the reel 2 is switched from the left side to the right side. At this hold switching position, the reel 2 is located at an outermost point outside the core 3, so that this position will hereinafter be referred to as the outermost position of the reel.

Next, as shown in FIG. 7D, the reel 2 is swung on the right side of the core 3 from the outside to the inside thereof as the first arm 22R is extended by changing the extension directions of the first movable member 23, the second movable member 24, and the holding member 25 by the use of the respective rotation mechanisms 27a to 27c of the first arm 22R. At the same time, the core 3 is rotated in a circumferential direction as the drive roll 31 is rotated by operating the drive unit 34. As a result, the wire 1 is moved from the left side to the right side of the core 3, so that it is wound around the core 3.

At this time, if the core 3 is moved backward in the direction closer to the reel 2 (in the direction from the innermost position to the outermost position of the reel) by moving the guide member 352 backward with the operation of the slide mechanism 353 of the core slide unit 35, then the winding speed of the wire 1 will be faster because the relative speed in the front-back direction of the reel 2 relative to the core 3 will be greater.

In the present embodiment, an illuminator 37 illuminates the winding position where the wire 1 is led out from the core 3. At the same time, the actual winding position is detected by the winding position detecting sensor 36 when the reel 2 is moved to the inside of the core 3, and based on the result of the detection, the circumferential position of the core 3 is adjusted. Thus the rotating position of wire winding can be adjusted, so that the wire can be accurately aligned with the target position on the core.

Next, when the reel 2 is swung to the innermost position on the right side of the core 3, the side for holding the reel 2 is switched. That is, after the holding bar 262 of the second arm 22L, which is located on the left side, is inserted into the interior of the shaft member 2d of the reel 2, the outer periphery of the shaft member 2d is grasped by the chuck 263, and at the same time the chuck 263 of the first arm 22R, which is located on the right side, is opened and the holding bar 262 is pulled out from the shaft member 2d of the reel 2.

At the point when the side for holding the reel 2 is switched from the right side to the left side, the reel 2 is back at the initial position, and the wire 1 has been wound around the core 3 by one turn.

Figure 8:
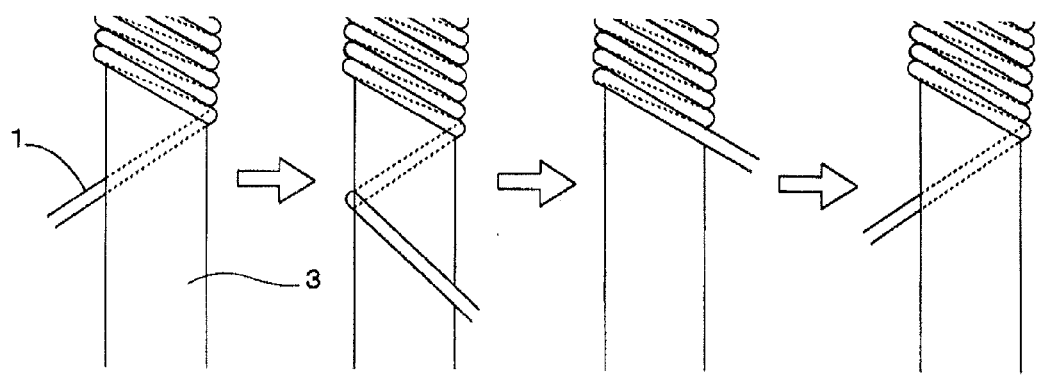
FIG. 8 is illustrations showing states of a wire being wound.

By the repetition of these processes of revolving the reel around the core 3, the wire 1 can be wound helically around the core 3 as shown in FIG. 8.

Note that for a Z-winding, the reel 2 should be held by the first arm 22R first, and the wire 1 should be led out to the right side of the core 3.

As described above, a reel 2 wound with a wire 1 is revolved in one direction through the inside and the outside of a core 3 by holding the reel 2 alternately on one side and on the other side of the core 3. And the wire 1 is wound helically around the core 3 by rotating the core 3 in a circumferential direction in association with the revolution of the reel 2. In this manner, cable beads of various sizes can be manufactured with a single apparatus because there is much freedom in the trajectory of the revolving motion of the reel 2.

Also, the rotation of the core 3 is controlled by detecting the winding position on the core 3 by the winding position detecting sensor 36. This ensures the formation of exact array of wire in desired positions relative to the core. Hence the reliability and quality of the cable bead can be improved.

Furthermore, the speed of winding motion raised by coordinated movements of both the reel 2 and the core 3 helps improve the productivity.

Note that switching the hold on the reel 2 is done within the ring of the core 3 in the foregoing embodiments, but this is not essential to the invention. The hold switching of the reel 2 may be done on the right or left side of the core 3. What is important is that the reel 2 is revolved in one direction through the inside and the outside of the core 3 by holding the reel 2 alternately by the use of the first and second arms 22R and 22L on one side, which is the right side, and on the other side, which is the left side. However, the hold switching of the reel 2 within the plane of the core 3 as in the foregoing embodiments is preferred because it provides easier control of the reel revolving means 20.

Also, the revolving motion of the reel 2 is not limited to a circular motion. It may be a revolving motion with an arc-like trajectory on the left side and on the right side. In the foregoing embodiment, the holder 26 is rotatably attached to the second movable member 24. This allows the reel 2 to be held with its axial direction in parallel with the axial direction of the core 3 at the transfer of the reel 2. Accordingly, the reel 2 can be transferred easily and reliably irrespective of the form of revolving motion of the reel 2.

Also, the description of the foregoing embodiments applies to the cases where the reel 2 is revolved in a horizontal plane using the horizontal rotation mechanisms 27a to 27c. However, it is possible to revolve the reel 2 in a plane inclined relative to the horizontal plane if vertical rotation mechanisms 27a' to 27c', in addition to the horizontal rotation mechanisms 27a to 27c, and a holder rotation mechanism 27d are used. As a result, the wire 1 can be wound around the core easily even when the core 3 is changed to a core of a different diameter.

Figure 9A:
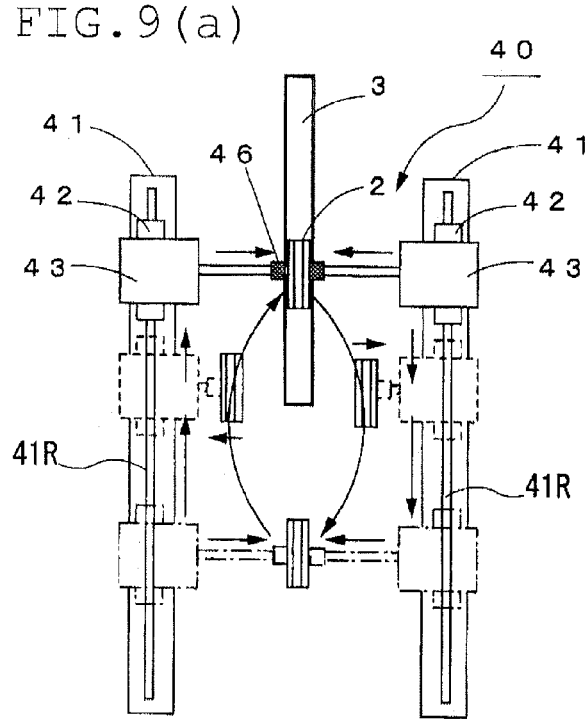
FIG. 9 is illustrations showing another arrangement of a reel revolving means in accordance with the present invention.
Figure 9B:
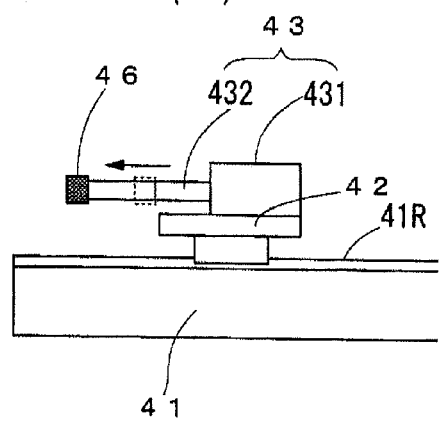

Also, in the foregoing embodiments, the reel revolving means 20 has a structure of the first and second arms 22R and 22L, each including the first movable member 23, the second movable member 24, and the holding member 25. However, a reel revolving means 40 as shown in FIG. 9 may be employed. The structure of the reel revolving means 40 is such that a holder 46 of the same constitution as the holder 26 is attached to the end of a rod 432 of an actuator 43 and the rod 432 is extended and retracted while the actuator 43 is moved frontward or backward. With this arrangement, too, the reel 2 can be revolved in one direction through the inside and the outside of the core 3 by holding the reel 2 alternately on one side and on the other side of the core 3.

More specifically, a railed base 41 is placed on each of the right and left sides of the core 3. A slide member 42 is mounted on each of rails 41R which are provided on the railed bases 41 and extend in the front-back direction. And the actuator body 431 of the actuator 43 is secured on the slide member 42 in such orientation that the extension-retraction direction of the rod 432 is in line with the axial direction of the core 3. The holder 46 is attached to the end of the rod 432.

In this arrangement, the slide member 42 is slid on the rail 41R by a not-shown drive means while the rod of the actuator 43 is extended or retracted. Then the reel 2 wound with wire 1 can be revolved in one direction through the inside and the outside of the core 3 by holding the reel 2 alternately on one side and on the other side of the core 3.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

INDUSTRIAL APPLICABILITY

As described above, the present invention ensures easy and efficient manufacture of cable beads, which displays excellent wire winding performance. It will improve the productivity of cable bead manufacture and the performance of the tire.

DESCRIPTION OF REFERENCE NUMERALS 1 wire
2 reel
2a cylinder
2b flange
2c hub

2*d* shaft member
3 annular core (core)
10 cable bead manufacturing apparatus
20 reel revolving means
21 body
22R first arm
22L second arm
23 first movable member
24 second movable member
25 holding member
26 holder
261 attachment member
262 holding bar
263 chuck
27*a*-27*c* horizontal rotation mechanism
30 core moving unit
31 drive roll
32 holddown roll
33 support roll
34 drive unit
35 core slide means
36 winding position detecting sensor
37 illuminator
38 base

The invention claimed is:

1. A method for manufacturing a cable bead, comprising the steps of:
    revolving a reel wound with a wire in one direction through an inside and an outside of an annular core by holding the reel alternately on one side and on the other side of the core;
    rotating the core in a circumferential direction in association with the revolving motion of the reel;
    winding the wire helically around the core;
    sliding the core, as the core is rotated in a circumferential direction, in a direction from an outermost position toward an innermost position of the reel when the reel is swung from the inside to the outside of the core; and
    sliding the core, as the core is rotated in a circumferential direction, in a direction from the innermost position toward the outermost position of the reel when the reel is swung from the outside to the inside of the core.

2. The method for manufacturing the cable bead according to claim 1, wherein the operation to be repeated comprises the steps of:
    holding the reel on a side thereof opposite from the core and swinging the reel on the other side of the core;
    switching the side for holding the reel after the swing motion;
    swinging the reel held from the switched side for holding the reel on the one side of the core; and
    again switching the side for holding the reel after the swing motion.

3. The method for manufacturing the cable bead according to claim 2, wherein the reel is revolved within a plane perpendicular to a plane formed by the ring of the core.

4. The method for manufacturing the cable bead according to claim 1, wherein the reel is revolved within a plane perpendicular to a plane formed by the ring of the core.

5. An apparatus for manufacturing the cable bead, comprising:
    a reel revolving means disposed on one side and on the other side of an annular core for revolving a reel wound with a wire through an inside and an outside of the core by holding the reel alternately on one side and on the other side of the core;
    a core rotating means for rotating the core in a circumferential direction in association with the revolving motion of the reel; and
    a slide mechanism configured to:
        slide the core, as the core is rotated in a circumferential direction, in a direction from the outermost position toward the innermost position of the reel when the reel is swung from the inside to the outside of the core and
        slide the core, as the core is rotated in a circumferential direction, in a direction from the innermost position toward the outermost position of the reel when the reel is swung from the outside to the inside of the core, wherein the wire is wound helically around the core.

6. The apparatus for manufacturing the cable bead according to claim 5, wherein the reel revolving means further includes a first arm disposed on one side of the core to hold the reel on a side thereof opposite from the core and swing the reel to the other side of the core and a second arm disposed on the other side of the core to hold the reel on a side thereof opposite from the core and swing the reel to the one side of the core, each of the arms including a body, a first movable member rotatably connected to a body, a second movable member rotatably connected to the first movable member, and a holding member rotatably connected to the second movable member to hold the reel, the holding member provided with a switching means for holding and releasing the reel.

* * * * *